United States Patent
LaCoste

(10) Patent No.: US 6,209,308 B1
(45) Date of Patent: Apr. 3, 2001

(54) PROCESS AND APPLICATION FOR THE CO-GENERATION OF ELECTRICAL ENERGY AND STEAM

(75) Inventor: Christian LaCoste, Le Pecq (FR)

(73) Assignee: L'Air Liquide, Societe Anonyme pour l'Etude et l'Exploitation des Procedes Georges Claude, Paris Cedex (FR)

( * ) Notice: Subject to any disclaimer, the term of this patent is extended or adjusted under 35 U.S.C. 154(b) by 0 days.

(21) Appl. No.: 09/332,982

(22) Filed: Jun. 15, 1999

(30) Foreign Application Priority Data

Dec. 23, 1998 (FR) .................................................. 98 16313

(51) Int. Cl.[7] .............................. F02C 3/00; F02C 6/18; F02B 43/00
(52) U.S. Cl. ...................... 60/39.02; 60/39.07; 60/39.12; 60/39.465
(58) Field of Search ............................... 60/39.02, 39.07, 60/39.12, 39.465, 39.182

(56) References Cited

U.S. PATENT DOCUMENTS

| 3,930,367 | * | 1/1976 | Gasparoli ........................ 60/39.182 |
| 4,942,734 | | 7/1990 | Markbreiter et al. . |
| 5,899,175 | * | 5/1999 | Manikowski et al. .................... 123/3 |
| 5,980,609 | * | 11/1999 | Baker et al. ............................ 95/39 |

FOREIGN PATENT DOCUMENTS 2 261 225   5/1993   (GB) .
WO 96/14495   5/1996   (WO) .

* cited by examiner

Primary Examiner—Charles G. Freay
(74) Attorney, Agent, or Firm—Young & Thompson

(57) ABSTRACT

A gaseous sub-product from an industrial unit is compressed and then treated in a permeator to bring its hydrogen content to a value below or equal to 5% to provide a combustible gas for a gas turbine.

28 Claims, 1 Drawing Sheet

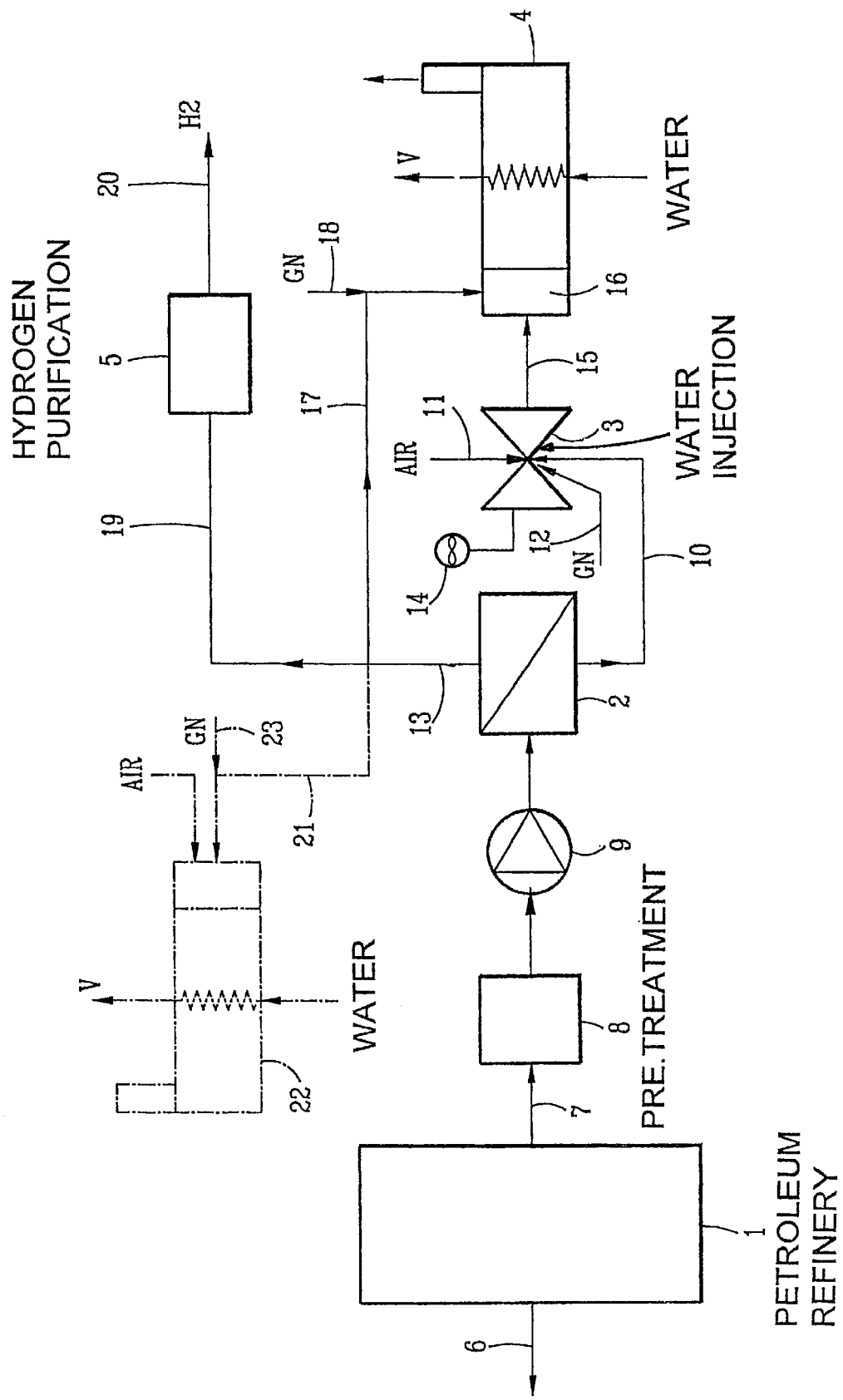

PROCESS AND APPLICATION FOR THE CO-GENERATION OF ELECTRICAL ENERGY AND STEAM

BACKGROUND OF THE INVENTION

The present invention relates to a process for co-generation of electrical energy and steam, by means of a gas turbine and a boiler for recovering heat from the exhaust gas of this gas turbine, at an industrial site of which a unit supplies a gaseous sub-product containing methane and hydrogen.

The invention is particularly applicable to the co-generation carried out at petrochemical sites, particularly at petroleum refineries.

DESCRIPTION OF THE RELATED ART

At present, co-generation units are frequently installed at petrochemical sites, because of their high energy output. These units comprise a gas turbine whose combustion chamber is supplied with natural gas and which is followed by a boiler for recovering the heat of the exhaust gases of the turbine, this boiler producing steam under pressure.

To permit complying with more and more restrictive regulations concerning $NO_x$ emissions from such units, gas turbine manufacturers provide versions operating with combustion in a dry chamber and with a low $NO_x$ emission. These gas turbines are generally known as "Dry Low $NO_x$," turbines, or DLN or as "Dry Low Emission" or DLE and can be of the so-called "Heavy Duty" type or of the so-called "Aeroderivative" type. An example of these machines is the gas turbine GEF6FA DLN, of 70 MW, of the General Electric company.

As is well known, the DLN or DLE gas turbines derive their properties from a particular burner technology, generally with staged combustion, and with high output regulation means.

The se DLN or DLE gas turbines however impose constraints on the composition of the combustible gas which resupplies them. In particular, this gas must generally not comprise more than 5% hydrogen (by volume), and sometimes even less, and must have a relatively stable composition.

It has also been proposed, to reduce $NO_x$ emissions, to inject water or steam into the combustion chamber of a gas turbine of conventional design, which is to say is not of the DLN or DLE type. However, there has not generally been achieved in this manner very low $NO_x$ contents (25 ppm) required by current regulations. Moreover, this technique consumes large quantities of demineralized water, which can amount to several tens of tons per hour, which is then lost to the atmosphere.

Refineries and other major petrochemical units produce moreover gaseous sub-products containing a variable proportion of hydrogen (20 to 95%). According to the requirements of downstream user units, a portion of the hydrogen can be recovered commercially from sub-products containing the most hydrogen (generally ≧50%). The balance of the gaseous sub-products, which, in most cases, cannot be sold, must most often be burned as an unavoidable product in boilers for stream production.

For a given steam requirement, this unavoidable production of vapor correspondingly reduces the size of the co-generation unit which it is possible to install on the site, thereby rendering this unit less profitable, reducing the increase of overall energy output of the complex and preventing further decreasing the overall level of $CO_2$ emitted by the production line of steam and electricity.

SUMMARY OF THE INVENTION

The invention has for its object to make commercially attractive in a more efficacious manner the gaseous sub-products by improving both the environmental protection and the overall energy output of the complex, and by reducing water consumption.

To this end, the invention has for its object a process of the above type, characterized in that:

if necessary, said sub-product is compressed;

this sub-product is reduced in hydrogen to a hydrogen level at most equal to 5% and preferably at most equal to 2%, to form a combustible gas principally constituted by methane; and there is used this combustible gas to supply the combustion chamber of the gas turbine.

The process according to the invention can comprise one or several of the following characteristics, taken alone or in all possible technical combinations:

there is used at least one fraction of the residual gas of the operation of reducing hydrogen, enriched in hydrogen, as a combustible in a post-combustion operation at the inlet of the recovery boiler;

there is used a fraction of the residual gas from the operation of reducing hydrogen content, enriched in hydrogen, as a combustible in an auxiliary boiler for the production of steam;

there is added to said combustible a supplemental amount of an auxiliary combustible, particularly natural gas;

at least a fraction of the residual gas from the hydrogen reduction operation, enriched in hydrogen, is purified to produce a substantially pure hydrogen flow;

there is added to said combustible gas an extra amount of an auxiliary combustible, particularly natural gas;

there is carried out a pre-treatment for the elimination of impurities and/or of dirt from said sub-product before the operation of reducing hydrogen content;

said reduction of hydrogen content is a treatment of said sub-product by selective permeation;

the gas turbine is of the type with a dry combustion chamber and low emission of $NO_x$;

the gas turbine operates with water injection or steam injection into its combustion chamber;

said gaseous sub-product contains 20 to 60% methane, 10 to 65% hydrogen and other constituents;

said unit is a petrochemical installation, particularly a petroleum refinery, and the gaseous sub-product has the following composition:
$CH_4$=30 to 70%
$H_2$=10 to 40%
$\Sigma C_2$=0 to 40%
miscellany=0 to 20%;

said combustible gas has for its composition:
$CH_4$=40 to 90%, particularly 50 to 90%
$H_2$=0 to 5%
$\Sigma C_2$=0 to 45%
miscellany=0 to 25%;

said unit is a ferrous metallurgical unit and the gaseous sub-product is a coke oven gas whose composition is as follows:
$CH_4$=20 to 30%
$H_2$=55 to 65%

$\Sigma C_2$=2 to 8%
$N_2$=1 to 6%
CO=2 to 10%
miscellany=0 to 10%;
said combustible gas has for its composition:
$CH_4$=60 to 70%
$H_2$=0 to 5%
$\Sigma C_2$=5 to 20%
$N_2$=5 to 15%
CO=5 to 15%
miscellany=0 to 10%.

The invention also has for its object an installation for co-generation adapted to practice such a process.

This installation, of the type comprising a gas turbine and a boiler for recovery of the heat of the exhaust gases of this gas turbine, is characterized in that it comprises: if necessary, compression means for said sub-product; means for reducing in hydrogen the compressed sub-product to form a combustible gas; and means for supplying the combustion chamber of the gas turbine with said combustible gas.

The invention also has for its object an industrial complex comprising an industrial unit which supplies a gaseous sub-product containing methane and hydrogen, and an installation for co-generation as described above.

The expression "containing methane and hydrogen" as here used must of course be considered to include the possibility of the presence of other constituents.

DESCRIPTION OF THE PREFERRED EMBODIMENT

An example of embodiment of the invention will now be described with respect to the accompanying drawing, whose single FIGURE shows schematically an industrial complex according to the invention.

The industrial complex schematically shown in the drawing essentially comprises a petroleum refinery 1, an apparatus 2 for selective permeation, for example with polyaramide or polyimide membranes, a gas turbine 3 of the GEF6FA DLN type of 70 MW, a recovery boiler 4 and an apparatus 5 for the purification of hydrogen.

In what follows, the pressures are absolute pressures, and each fluid flow will be designated by the same reference as the conduit which carries it. Moreover, the percentages indicated are percentages by volume.

From the refinery 1, petroleum products 6 leave, on the one hand, and on the other hand the gaseous sub-products or "off-gas" 7 also leaves. The composition of these sub-products is typically:
$CH_4$=30 to 70%
$H_2$=10 to 40%
$\Sigma C_2$=0 to 40%
miscellany=0 to 20%,
the total amounting to 100% and the $C_2$ constituents being essentially ethane and ethylene. The flow rate of this gas 7 is in this example of the order of 25,000 $Nm^3$/h.

These sub-products are if desired pre-treated at 8, for example to eliminate impurities that would be undesirable downstream, such as sulfur or chlorine, by any known process.

The sub-products 7 are then compressed by a compressor 9 to a pressure of the order of 20 to 60 bars, and introduced preferably above the dew point into the permeator 2. This latter supplies a principal current 10 of combustible gas reduced in hydrogen, which constitutes the off-gas of the permeator. This current 10 typically comprises 60 to 80% of the entering flow rate and typically has the following composition:
$CH_4$=40 to 90%
$H_2$=0 to 5%
$\Sigma C_2$=0 to 45%
miscellany=0 to 25%.

This gas, rich in methane, having a moderate reduced ethane content and almost free from hydrogen, serves for the supply of the combustion chamber of the gas turbine 3. This latter thus operates with a gas as combustible material, air 11 as combusting material, and if desired an additional amount 12 of an auxiliary fuel such as natural gas.

The permeate 13 from the permeator 2, representing 20 to 40% of the entering flow rate, is rich in hydrogen and is available at a low pressure of 1 to 6 bars. It typically has the following composition:
$CH_4$=10 to 45%
$H_2$=45 to 80%
$\Sigma C_2$ 0 to 20%
miscellany=0 to 10%.

The gas turbine 3 produces on the one hand electricity, at 14, and on the other hand exhaust gases 15, which are sent to the recovery boiler 4.

The boiler 4 comprises at its input a post-combustion chamber 16 provided with burners (not shown). These latter are supplied on the one hand by the exhaust gas 15 acting as a combustible, on the other hand, acting as combustion material, by a fraction 17 of the permeate 13, if desired admixed with added combustible 18 such as natural gas.

The remainder 19 of the permeate 13 is purified at 5, for example by cryogenics or by selective PSA adsorption (Pressure Swing Adsorption or Pressure Modulated Adsorption), to produce a pure hydrogen flow 20.

If desired, a fraction 21 of the permeate not consumed in the boiler 4 can be burned with air in a conventional auxiliary boiler 22 for the production of steam, if desired in mixture with an added combustible 23 such as natural gas.

The process described above has great advantages. On the one hand, it permits producing all the steam by the boiler 4, which is to say under optimum economic conditions, with an assembly for co-generation of high capacity. The overall energy output of the complex 1–3 is thus maximized.

Moreover, the process permits satisfying even the most stringent emission controls as to $NO_x$, thanks to the use of a DLN or DLE turbine, which introduces no dimineralized water consumption for its operation with low $NO_x$.

Moreover, the permeate 13 being at least as rich in hydrogen as the sub-products of the petrochemical units conventionally considered as rich in hydrogen, the overall rate of recovery of hydrogen is very favorable and can justify the erection of a purification apparatus 5 if the work site does not yet have one.

In another application of the invention, the unit 1 is a ferrous metallurgical unit from which a gaseous product 7 leaves, constituted by coke oven gas. The table below indicates the typical compositions of these gases, of the combustible gas 10 reduced in hydrogen, and of the permeate 13.

| % volume | inlet current 7 | example of calculation of permeate 13 | example of calculation of combustible gas 10 |
|---|---|---|---|
| $CH_4$ | 20 to 30 | 0 to 10 | 60 to 70 |
| $H_2$ | 55 to 65 | 80 to 95 | 0 to 5 |
| $\Sigma C_2$ | 2 to 8 | 0 to 5 | 5 to 20 |
| $N_2$ | 1 to 6 | 0 to 5 | 5 to 15 |
| CO | 2 to 10 | 0 to 5 | 5 to 15 |
| Quantity recovered (% volume) | 100 | 65 | 35 |

It will be noted that, in this case, it is the permeate 13 which constitutes the principal flow from the permeator 2.

With such a supply gas from the permeator, it is desirable that the pre-treatment 8 comprise particularly a dirt removal, a benzine removal and an asphalt removal in addition to the treatments suggested above.

As a modification, no matter what the supply gas used, the permeator 2 can be replaced by another apparatus for separating hydrogen, particularly by a PSA apparatus. In this case, it may be necessary to recompress the combustible gas product by the PSA apparatus. The separation by permeation appears at present to be the most favorable for same uses, particularly for the treatment of residual gases from petrochemical sites.

As another modification, no matter what the supply gas used, the same arrangement can be envisaged with a conventional gas turbine, which is to say neither DLN nor DLE, to contribute to reducing the emission level of $NO_x$ from the turbine assembly to the gas boiler for recovery, and particularly in combination with a water or steam injection into the combustion chamber of the gas turbine.

As will be understood, other gaseous sub-products can be treated, particularly when they are rich in methane and/or relatively poor in hydrogen, or when they contain a principal portion of methane and hydrogen, which are easily separated.

What is claimed is:

1. A process for the co-generation of electrical energy and steam, comprising the steps of:
   reducing in hydrogen a gaseous sub-product containing methane and hydrogen to a hydrogen content at most equal to 5%, to form a combustible gas principally constituted by methane, the reduction producing a residual gas;
   supplying the combustible gas to a combustion chamber of a gas turbine; and
   using at least a fraction of the residual gas from the hydrogen reduction step as a combustible input in a post-combustion operation at an input of a recovery boiler.

2. Process according to claim 1, wherein there is added to the fraction of the residual gas an amount (18, 23) of an auxiliary combustible.

3. Process according to claim 1, wherein the at least a fraction of the residual gas from the hydrogen reduction step is purified to produce a flow of substantially pure hydrogen.

4. Process according to claim 1, comprising the further step of adding to the combustible gas an amount of an auxiliary combustible.

5. Process according to claim 1, comprising the further step of carrying out a pre-treatment for the elimination of impurities and/or of dirt from the sub-product before the hydrogen reduction step.

6. Process according to claim 1, wherein said reduction of hydrogen step is a treatment of the sub-product by selective permeation.

7. Process according to claim 1, the gas turbine to which the combustible gas is supplied, includes a dry combustion chamber.

8. Process according to claim 1, comprising the further step of infecting water or steam into the combustion chamber of the gas turbine.

9. Process according to claim 1, wherein a petroleum refinery provides the gaseous sub-product, and
   the gaseous sub-product has the following composition:
   $CH_4$=30 to 70%
   $H_2$=10 to 40%
   $\Sigma C_2$=0 to 40%
   miscellany=0 to 20%.

10. Process according to claim 9, wherein the combustible gas has the composition:
    $CH_4$=40 to 90%, particularly 50 to 90%
    $H_2$=0 to 5%
    $\Sigma C_2$=0 to 45%
    miscellany=0 to 25%.

11. The process of claim 1, wherein the sub-product is compressed prior to being reduced in hydrogen.

12. The process of claim 1, wherein said reducing step reduces the gaseous sub-product containing methane and hydrogen to a hydrogen content at most equal to 2%.

13. A process for the co-generation of electrical energy and steam, comprising the steps of:
    reducing in hydrogen a gaseous sub-product containing methane and hydrogen to a hydrogen content at most equal to 5%, to form a combustible gas principally constituted by methane, the reduction producing a residual gas;
    supplying the combustible gas to a combustion chamber of a gas turbine; and
    using a fraction of the residual gas from the hydrogen reduction step as a combustible input in an auxiliary boiler for the production of steam.

14. A process for the co-generation of electrical energy and steam, comprising the steps of:
    reducing in hydrogen a gaseous sub-product containing methane and hydrogen to a hydrogen content at most equal to 5%, to form a combustible gas principally constituted by methane, the reduction producing a residual gas; and
    supplying the combustible gas to a combustion chamber of a gas turbine;
    wherein the gaseous sub-product contains 20 to 60% methane, 10 to 65% hydrogen and other constituents prior to the hydrogen reduction step.

15. A process for the co-generation of electrical energy and steam, comprising the steps of:
    reducing in hydrogen a gaseous sub-product containing methane and hydrogen to a hydrogen content at most equal to 5%, to form a combustible gas principally constituted by methane, the reduction producing a residual gas; and
    supplying the combustible gas to a combustion chamber of a gas turbine,
    wherein the gaseous sub-product is produced by a ferrous metallurgical unit and
    the gaseous sub-product is a coke oven gas whose composition is as follows:

$CH_4$=20 to 30%
$H_2$=55 to 65%
$\Sigma C_2$=2 to 8%
$N_2$=1 to 6%
CO=2 to 10%
miscellany=0 to 10%.

16. Process according to claim 15, wherein the combustible gas has the composition:

$CH_4$=60 to 70%
$H_2$=0 to 5%
$\Sigma C_2$=5 to 20%
$N_2$=5 to 15%
CO=5 to 15%
miscellany=0 to 10%.

17. An installation for the co-generation of electrical energy and steam at an industrial site, comprising a unit which supplies a gaseous sub-product containing methane and hydrogen;

a gas turbine producing exhaust gases;

a boiler arranged for recovery of the heat of the exhaust gases from the gas turbine, a hydrogen reduction means for reducing in hydrogen the gaseous sub-product to form a combustible gas;

a means for supplying a combustion chamber of the gas turbine with the combustible gas, and a means to supply post-combustion burners, provided at an input of the boiler, with a residual gas from the hydrogen reduction means.

18. Installation according to claim 17, further comprising a means to supply the post-combustion burners with an auxiliary combustible.

19. Installation according to claim 17, further comprising an apparatus for the purification of hydrogen and a means to supply this apparatus with at least one fraction of the residual gas from the hydrogen reduction means.

20. Installation according to claim 17, further comprising, upstream of the hydrogen reduction means, an apparatus for pre-treatment adapted to eliminate from the sub-product impurities and/or dirt.

21. Installation according to claim 17, wherein the hydrogen reduction means comprises a selected permeation apparatus.

22. Installation according to claim 17, wherein said unit is a petrochemical unit.

23. Installation according to claim 17, wherein said unit is a first metallurgical unit and the gaseous sub-product is a coke oven gas.

24. Installation according to claim 17, wherein the gas turbine comprises a dry combustion chamber.

25. Installation according to claim 17, further comprising a injector operatively connected to the gas turbine for supplying water or steam so that the gas turbine operates with water or steam injection into said combustion chamber.

26. Installation of claim 17, wherein electrical energy and steam are co-generated.

27. An installation for the co-generation of electrical energy and steam at an industrial site, comprising a unit which supplies a gaseous sub-product containing methane and hydrogen;

a gas turbine producing exhaust gases;

a boiler arranged for recovery of the heat of the exhaust gases from the gas turbine, a hydrogen reduction means for reducing in hydrogen the gaseous sub-product to form a combustible gas;

a means for supplying a combustion chamber of the gas turbine with the combustible gas, and an auxiliary boiler for a production of steam with a means to supply burners of this auxiliary boiler with the residual gas from the hydrogen reduction means.

28. Installation according to claim 27, further comprising a means to supply the burners of the auxiliary boiler with an auxiliary combustible.

* * * * *